United States Patent [19]
Jackson et al.

[11] Patent Number: 5,541,652
[45] Date of Patent: Jul. 30, 1996

[54] HYPERACUITY SENSING

[75] Inventors: Warren B. Jackson, San Francisco; David K. Biegelsen, Portola Valley, both of Calif.

[73] Assignee: Xerox Corporation, Stamford, Conn.

[21] Appl. No.: 426,439

[22] Filed: Apr. 21, 1995

Related U.S. Application Data

[63] Continuation of Ser. No. 152,044, Nov. 12, 1993, abandoned.

[51] Int. Cl.⁶ .............................. H04N 3/12; H04N 3/14; H04N 5/335
[52] U.S. Cl. ..................... 348/332; 348/294; 257/291
[58] Field of Search ..................................... 348/218, 241, 348/252, 332, 625, 627, 26, 294; 257/656, 291, 458, 459, 444, 448; 382/192–195

[56] References Cited

U.S. PATENT DOCUMENTS

| | | | |
|---|---|---|---|
| 4,739,384 | 4/1988 | Higashi et al. | 357/30 |
| 4,765,732 | 8/1988 | Fnoch | 351/243 |
| 4,771,471 | 9/1988 | Kitamura | 382/41 |
| 5,151,787 | 9/1992 | Park | 358/162 |
| 5,204,910 | 4/1993 | Lebeau | 382/8 |
| 5,231,677 | 7/1993 | Mita et al. | 382/22 |

OTHER PUBLICATIONS

Subpixel measurments using a moment based edge operator Lyvers, E. P. IEEE, vol. 11, No. 12 Dec. 1989.
A Simple Method of segmentaction with sub pixel accuracy Forte, P. IEE 1989.
Boundary description and measurement with sub–pixel/voxel accuracy 1992.
Precise localization of geometrically known imge edges in noisy environment Xu, C. Nov. 1990.

*Primary Examiner*—Wendy Greening
*Assistant Examiner*—Bipin Shalwala

[57] ABSTRACT

Methods and devices for implementing hyperacuity sensing are provided. The imaging device comprises a sensor array including sensor elements, each of which provides intracellular spatial intensity distribution information necessary to render images with subpixel accuracy. The method includes the step of hyperacuity sensing implemented using sensors that output signals that are dependent upon the internal intensity distribution of impinging light. The output signals are processed to determine the internal intensity distribution, which can then be used to produce a hyperacuity image. Such a hyperacuity image has enhanced definition of edges, and reduced artifacts such as jaggies and moire effects.

7 Claims, 6 Drawing Sheets

HYPERACUITY SENSING

This is a continuation of application Ser. No. 08/152,044, filed Nov. 12, 1993 now abandoned.

BACKGROUND OF THE PRESENT INVENTION

Most image sensing devices operate by projecting an image that is to be scanned onto an array of discrete image sensor elements (usually p-i-n diodes). The projected image is then determined by interrogating the condition of the sensor array elements. For example, FIG. 1 shows a 4×5 element section of an array 10 onto which an image having an edge 12 is projected. The term edge is used herein to mean the border defined by light illuminated areas and areas under ambient conditions. It is assumed that the area of the array 10 above the edge 12 is illuminated, while the area below the edge is dark.

The twenty elements, shown as the twenty squares 14, are organized into rows A through D, and columns R through V. To scan the image, the illumination state of each of the elements is determined using matrix addressing techniques. If a particular element is sufficiently illuminated, for example the element at row A, column R, the element is sensed as being at a first state (ON). If a particular element is not sufficiently illuminated, say the element at row D, column V, that element is sensed as being in a second state (OFF). If a particular element is partially illuminated, its state depends upon how much of the element is illuminated, and the intensity of that illumination. An interrogation of all of the illustrated elements of the array 10 results in the rather coarse approximation to the image as shown in FIG. 1, with the ON state elements in white and the OFF state elements in cross-hatch. This cross-hatched representation results from a binary thresholding of the pixel (sensor element) values. An alternative prior art implementation provides a continuous value for each pixel (gray scale). In both of these prior art implementations, the edge position information within a pixel is converted to a spatial average.

When using imaging scanners as described above, an increase in accuracy of the image approximation requires smaller and more numerous sensor elements. However, the difficulty of fabricating closely spaced, but isolated, sensor elements becomes prohibitive when attempting to fabricate page width imaging devices that have very high acuity (e.g., an acuity approaching that of the human visual system).

In addition to the discrete sensor elements described above, another type of light sensitive element, called a position sensitive detector, exists. An example of a position sensitive detector is the detector 200 shown in FIG. 2. This detector outputs photogenerated analog currents 202, 204, 206, and 208, that can be used to determine the position of the centroid of the illuminating spot 210. The centroid of the light spot in the x-direction (horizontal) can be computed from the quantity $(I_{206}-I_{208})/(I_{206}+I_{208})$, while the centroid of the light spot in the y-direction (vertical) can be computed from $(I_{202}-I_{204})/(I_{202}+I_{204})$, where $I_{20x}$ is the current from one of the lateral elements. At least partially because position sensitive detectors are typically large (say from about 1 cm×cm to 5 cm×5 cm), they have not been used in imaging arrays.

Ideally, an imaging device should be able to match the ability of the human visual system to determine edge positions, a capability known as edge acuity. Because of the difficulties in achieving high spatial resolution by increasing the pixel density, current image scanners cannot match the high edge acuity of human perception. Thus, new imaging and scanning techniques are necessary. Such new techniques would be particularly valuable if they could identify the positions of an edge to a fraction of the interpixel spacing. The ability to resolve edge spacings finer than the interpixel spacing is referred to as hyperacuity.

SUMMARY OF THE INVENTION

The present invention implements hyperacuity sensing. Hyperacuity sensing is implemented using an array of sensors whose output signals are dependent upon the internal intensity distribution of the impinging light. The output signals are processed to determine the intra-sensor intensity distribution, which is then used to produce a hyperacuity image. Such hyperacuity images enhance the definition of edges, and reduce undesirable artifacts such as jaggies and moire effects.

BRIEF DESCRIPTION OF THE DRAWINGS

Other aspects of the present invention will become apparent as the following description proceeds and upon reference to the drawings, in which.

Note that the subsequent text includes various directional signals (such as right, left, up, down, top, bottom, lower and upper) which are taken relative to the drawings. Those directional signals are meant to aid the understanding of the present invention, not to limit it.

DETAILED DESCRIPTION OF THE ILLUSTRATED EMBODIMENTS

As discussed above, the acuity of prior art imaging scanners is limited by the separation of the individual elements of the scanner's sensor array (for a given image magnification). This limitation is overcome in the present invention using hyperacuity techniques which approximate the edges of light illuminating the position sensors. The follow description first provides a description of a hyperacuity sensor and its use in implementing the hyperacuity techniques, then a description of a hyperacuity array is provided, and finally, the fabrication of the hyperacuity sensor is described.

HYPERACUITY SENSING

Figure 3:
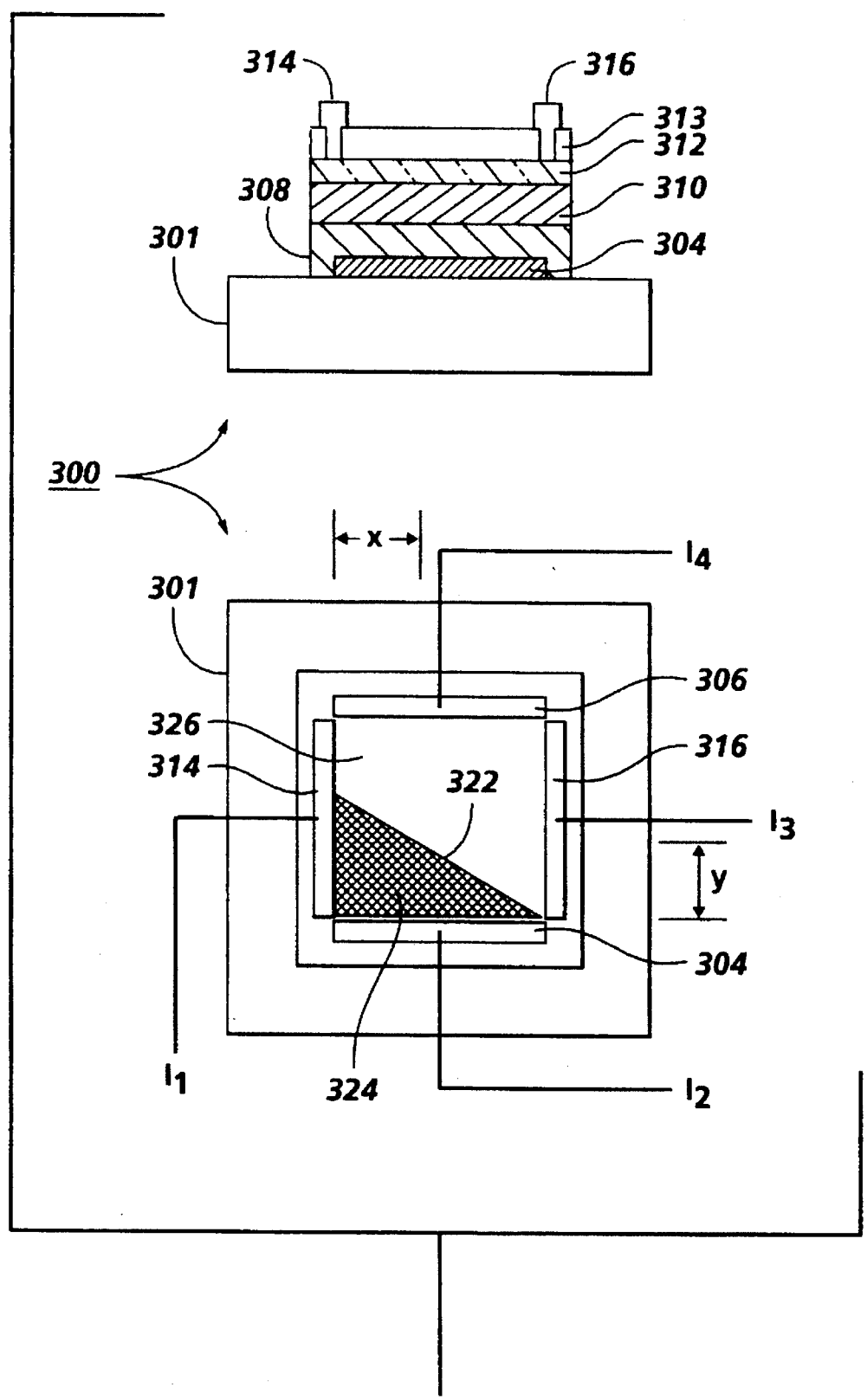
FIG. 3 provides depictions of a sensor suitable for extracting light distribution information within a pixel.

A sensor 300 that is suitable for use in hyperacuity sensing is illustrated in FIG. 3. The sensor 300 is an amorphous silicon position sensitive detector that is fabricated small enough to detect spatial distributions of light intensity at about 400 spots per inch. The sensor 300 has a substrate 301 on which is located a pair of lower electrodes 304 and 306.

Figure 2:
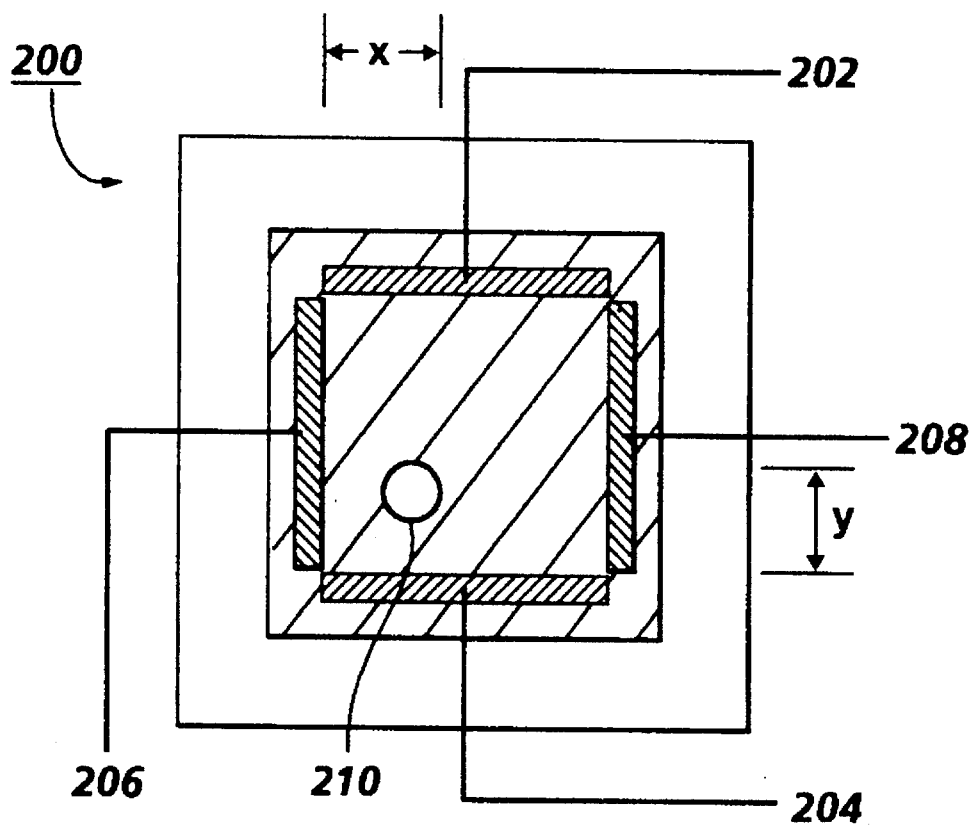
FIG. 2 shows a simplified depiction of a prior art position sensitive detector.

A lower, microcrystalline resistive layer 308 is formed over the lower electrodes 304 and 306. Over the resistive layer 308 is a vertical p-i-n diode 310 that is overlaid by an upper transparent, resistive layer 312 of a material such as indium tin oxide. Over the resistive layer 312 is a transparent insulating layer 313. Openings through the insulting layer 313 to the resistive layer 312 are formed using standard photolithographic methods. Then, top electrodes 314 and 316 which electrically connect to the resistive layer 312 are located over the formed openings. Except for various enhancements in materials and dimensions, the sensor 300 is similar to the sensor 200 shown in FIG. 2.

Figure 5:
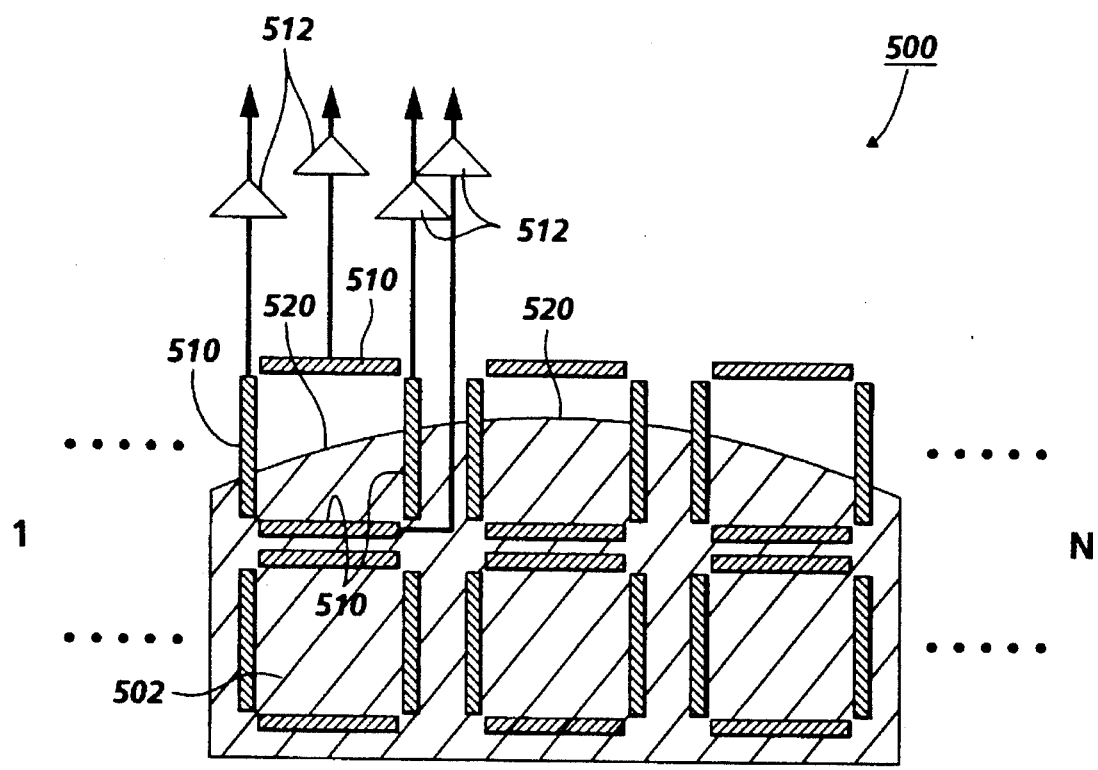
FIG. 5 shows a schematic depiction of a 2 element by 3 element section of an imaging array that is in accordance with the principles of the present invention.

Currents from the electrodes 304, 306, 314, and 316, the currents $I_2$, $I_4$, $I_1$, and $I_3$, respectively, which are due to the intensity distribution of light 320 that is projected onto the sensor 300, are applied to external amplifiers (see FIG. 5). The currents are analyzed as described below to determine a hyperacuity approximation for the distribution of the light which illuminates the sensor. The subpixel accuracy relates to the ability to identify spatial intensity distributions within the sensor cell as distinguished from intensity averaging over the entire cell. This intracellular spatial sensitivity allows one subsequently to render images with similar subpixel accuracy.

To approximate the illuminating light distribution within the sensor, a parametric model for the distribution of light within the sensor is first determined, and then, using the currents $I_1$ through $I_4$, the parameters for the model are determined and applied to the model. The result is the hyperacuity approximation of the illuminating light distribution. A particularly useful model for hyperacuity sensing is the edge model.

In the edge model, the impinging light intensity is assumed to be delineated by a straight edge 322 between black regions 324 and some uniform gray level regions 326 which subtends the active area of the sensor 300. While approximating the edge of the illuminating light, which may not be straight, using a straight line approximation may at first appear unacceptable, such a linear approximation is quite good because the size of the sensor 300 is comparable with or smaller than the smallest curvature of interest. The locations at which the edge approximation intersects the boundary of the sensor, as well as the gray level, can be determined from the four currents from the element 300 (see below). The edges of an image can therefore be assigned to a much smaller spatial dimension (more accurately determined) than the size of the sensor 300.

Using the edge model, the determination of the edge position, in terms of the measured currents, can be accomplished as follows. First, the current ratios $\bar{x}=I_3/(I_1+I_3)$ and $\bar{y}=I_4/(I_2+I_4)$, are computed. Then, from the current ratios the intercepts of an approximated edge with the sensor boundary can be uniquely determined using three separate conditions. First, if the point $(\bar{x}, \bar{y})$ falls within the region defined by the black square in the lower, left panel of FIG. 4, then the edge approximation intercepts the x axis at $w=3L\bar{x}$ and the y axis at $h=3L\bar{y}$, where L is the sensor size. This condition, which corresponds to the illumination condition shown in the upper, left panel of FIG. 4, is referred to as a type 1 condition.

Figure 4:
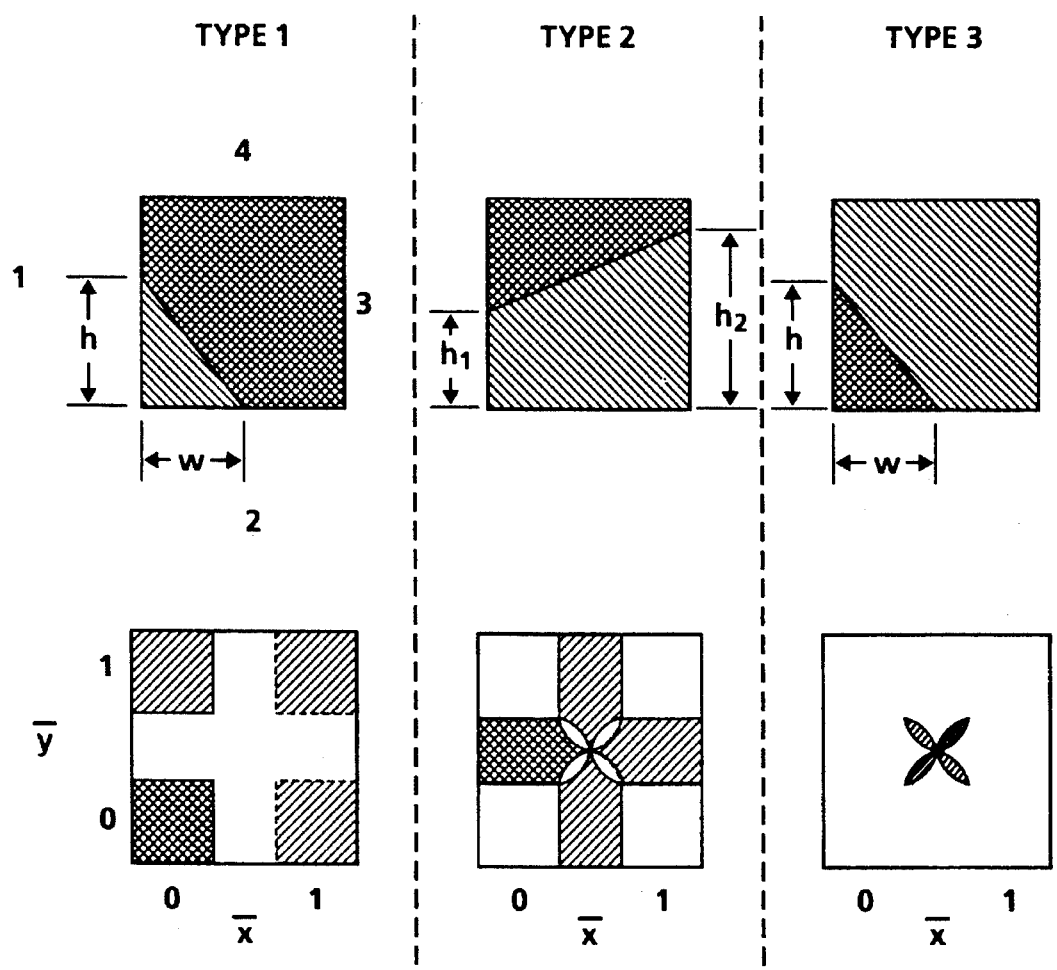
FIG. 4 helps illustrate a method for using position sensitive detectors to extract edge information.

The second condition occurs when if $(\bar{x}, \bar{y})$ falls within the black region of the lower, center panel in FIG. 4. In that case the edge approximation intercepts $h_1$ and $h_2$ are given by $(2-3\ \bar{x})\bar{y}L/(1-3\bar{x}(1-\bar{x}))$ and $(-1+3\ \bar{x})\bar{y}L/(1-3\bar{x}(1-\bar{x}))$, respectively. This condition, which corresponds to the illumination condition in the upper, center panel of FIG. 4, is referred to as the type 2 condition. Finally, if $(\bar{x}, \bar{y})$ falls within the black region depicted in the lower, right panel of FIG. 4, the edge approximation intercepts h and w are found from the relations $h=(\bar{x}-\frac{1}{2})L^2/(\bar{x}w/2-w^2/6\ L)$ and $w=(\bar{y}-\frac{1}{2})L^2/(\bar{y}h/2-h^2/6\ L)$. This condition, which corresponds to the illumination condition shown in the upper, right panel of FIG. 4, is referred to as the type 3 condition. Other values of $(\bar{x}, \bar{y})$ yield edge approximation intercepts with the sensor boundary by various rotation and mirror operations. The determination of a linear approximation to an edge is therefore unique.

GRAY SCALE HYPERACUITY SENSING

The above description of hyperacuity sensing used the edge model. Other intra-sensor intensity models are possible. For example, a second model that is useful in hyperacuity sensing interprets a gray scale approximation to the illuminating light. That model involves a parameterization in which the intensity within the sensor is taken to be a plane in a 3-dimensional (x, y, Φ) space where x and y are spatial dimensions and Φ is the light intensity. The linear approximation is determined from the current outputs from the sensor 300. If the light intensity, Φ(x,y) within the pixel is represented by Φ(x,y)=C+Ax+By with the origin at the center of the cell, then $C=I_T/L^2$ where $I_T=I_1+I_2+I_3+I_4$, $A=3\ \bar{x}\ I_T/L^4$ and $B=3\ \bar{y}\ I_T/L_4$. Thus, one can readily construct a piecewise linear model for the intensity within the sensor.

HYPERACUITY IMAGING ARRAYS

The above described hyperacuity sensors are useful in imaging devices. An imaging device that makes use of an array of hyperacuity sensors will be referred to as a hyperacuity imaging array. FIG. 5 shows a 2×3 section 500 of an array of hyperacuity sensors 502. Each sensor 502 has four electrodes 510 which connect to current amplifiers 512 (only four of which are shown). The currents from each sensor 502 are resolved as described above to form an approximation of the edge of the impinging light in each sensor 502.

For example, FIG. 5 shows an edge 520 defined by the boundary between illuminated and dark areas. The position of the edge 520 in each sensor 502 is approximated using the model described above. The location of the overall edge in the section 500 is determined by piecewise fitting together the approximations from each sensor 502. The accuracy of the approximation of the edge 520 is superior to that produced in prior art imaging scanners that use discrete sensor elements that are separated by similar distances as the present sensors 502.

Figure 1:
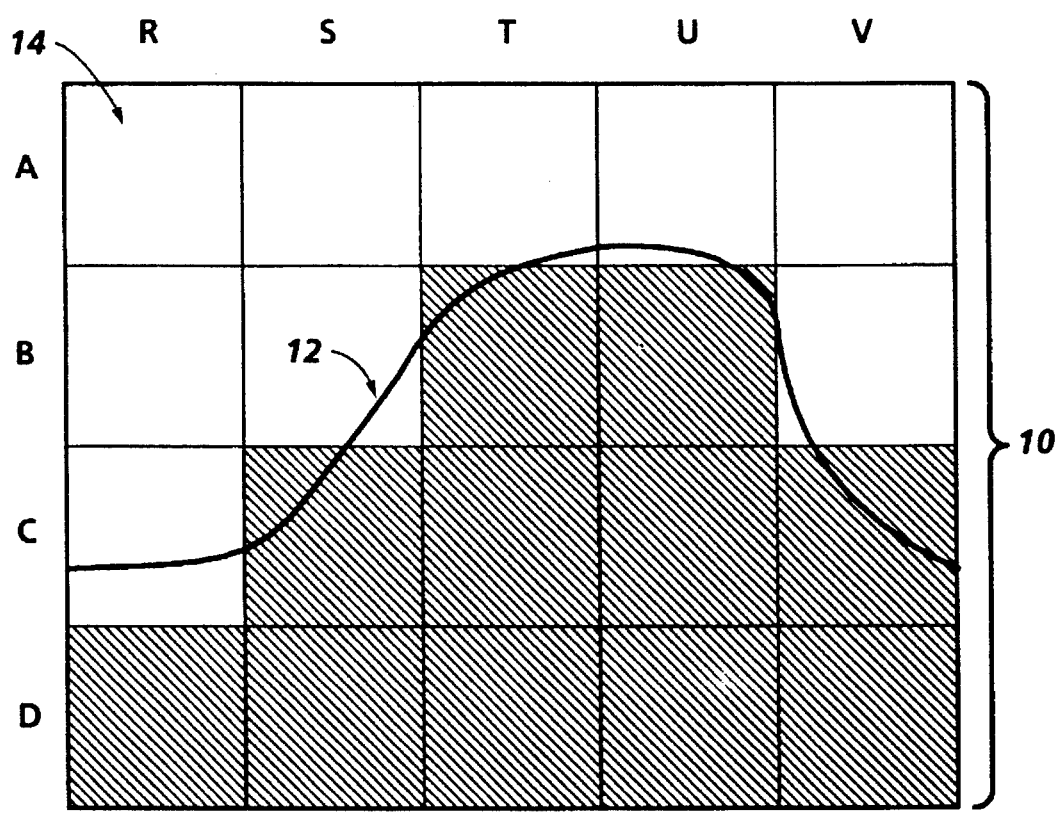
FIG. 1 shows a schematic depiction of a 4 element by 5 element section of a prior art imaging array.
Figure 6:
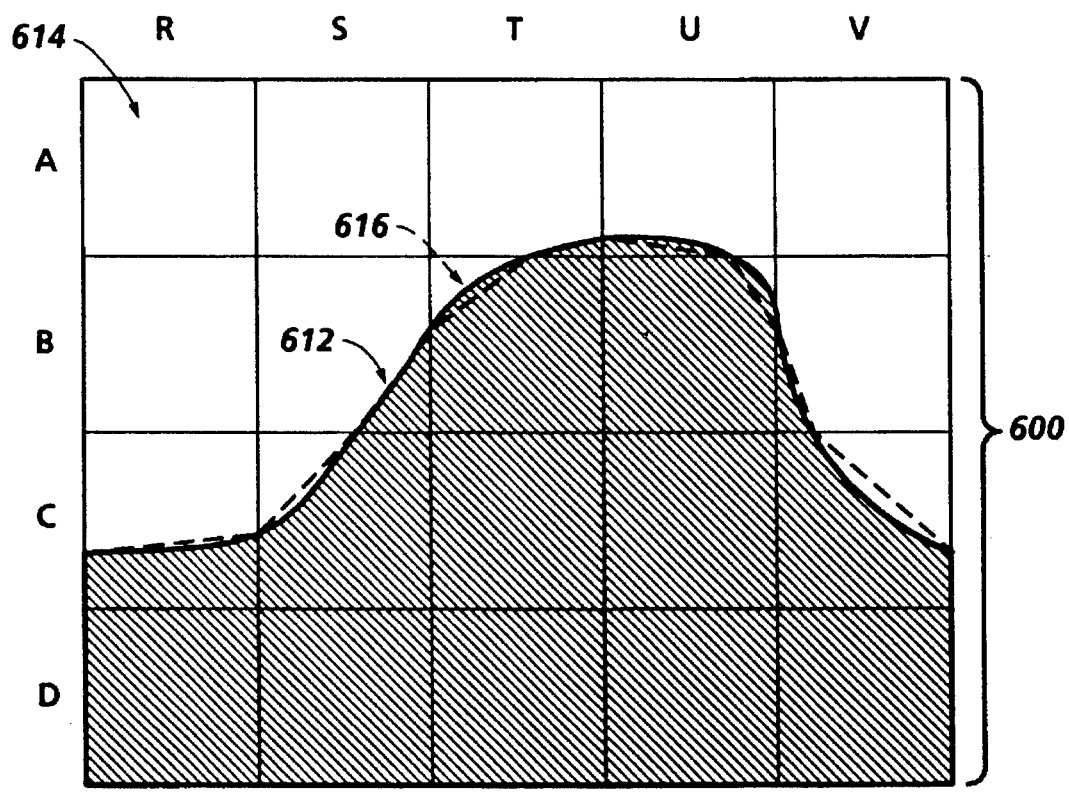
FIG. 6 shows the intensity information obtained using an array of intensity distribution sensitive pixels in accordance with the principles of the present invention;.

In FIG. 6 we show the improvement in image acuity arising from the use of the present invention applied to the same illumination as that used in FIG. 1. The array 600 consists of individual pixel sensors 614 which, in this example, are position sensitive detectors. The outputs in conjunction with the edge model have been used to determine the subpixel edge positions as shown by the lines 616. The improved accuracy in the approximation to the illuminating boundary 612 is evident.

While arrays which use hyperacuity sensors have four times as many outputs as comparable arrays of integrating pixels, the enhancement of the determination of the position of the light edge can be significantly greater than two orders of magnitude.

FABRICATION OF THE HYPERACUITY SENSOR ARRAY

A hyperacuity array can be fabricated on a glass substrate as follows. First, a chrome/molybdenum metal layer is deposited on the substrate by sputtering. Then, the chrome/ molybdenum metal layer is patterned to form the lower electrode pairs (which correspond to the electrodes 304 and 306 in FIG. 3). Next, a laterally resistive thin film of doped microcrystalline silicon (which corresponds to the resistive layer 308) is deposited uniformly over the substrate and lower electrodes. An undoped, hydrogenated amorphous silicon layer approximately 300 nm thick and a thin p-type amorphous silicon contacting layer are laid over the resistive thin film by using plasma deposition. A transparent conducting layer of indium tin oxide (ITO) is then deposited over the hydrogenated amorphous silicon layer. Next, an insulating film of silicon nitride is laid down over the indium tin oxide. That insulating film is then patterned to open trenches to the indium tin oxide layer. Aluminum is then deposited over the exposed top surface. That aluminum is then patterned to form the top electrode contacts, the vias, and the leads which apply the current signals to contact pads or to thin film pass transistors. Of course, many variations of the described fabrication process are possible. Such variations, which will be obvious to those trained in the art of semiconductor processing, do not change the basic invention.

From the foregoing, numerous modifications and variations of the principles of the present invention will be obvious to those skilled in its art. In particular, the shape and compositions of the sensor elements may be changed to fit a particular application. Therefore the scope of the present invention is defined by the appended claims.

What is claimed:

1. A sensor assembly for constructing a hyperacuity approximation of an image, the sensor assembly comprising a plurality of sensor elements positioned in an imaging array, with each sensor element in the imaging array having a defined area of less than one square centimeter for detecting incident radiation to provide a first output representative of total incident radiation intensity on each defined area, and a plurality of radiation detectors, with at least one radiation detector positioned within each defined area of each of the plurality of sensor elements in the imaging array, the at least one radiation detector in each defined area providing a second output approximating an intensity distribution of incident radiation within each of the defined areas of the plurality of sensor elements, with the first and second outputs together used to construct said hyperacuity approximation of the image.

2. The array according to claim 1, wherein the second output from the at least one radiation detector can be converted into an approximation of an edge position of the incident radiation within each of the defined areas of the plurality of sensor elements.

3. The array according to claim 1, wherein each of the plurality of sensor elements are sensitive to light radiation.

4. The array according to claim 2, wherein the second output further comprises output from four radiation detectors positioned within each of the defined areas of the plurality of sensor elements.

5. The array according to claim 1, wherein each of the plurality of sensor elements are sensitive to electron radiation.

6. The array according to claim 2, wherein the sensor elements have hexagonal shape.

7. The array according to claim 3, wherein each of the plurality of sensor elements are hexagonally arranged in the imaging array.

* * * * *